(12) United States Patent
Rousseau

(10) Patent No.: US 8,538,341 B2
(45) Date of Patent: Sep. 17, 2013

(54) METHOD OF COMMUNICATING BY RADIO FREQUENCIES IN A HOME-AUTOMATION INSTALLATION

(75) Inventor: Fabien Rousseau, Cluses (FR)

(73) Assignee: SOMFY SAS, Cluses (FR)

( * ) Notice: Subject to any disclaimer, the term of this patent is extended or adjusted under 35 U.S.C. 154(b) by 351 days.

(21) Appl. No.: 12/307,467

(22) PCT Filed: Jul. 3, 2007

(86) PCT No.: PCT/IB2007/001831
§ 371 (c)(1),
(2), (4) Date: Oct. 22, 2009

(87) PCT Pub. No.: WO2008/004085
PCT Pub. Date: Jan. 10, 2008

(65) Prior Publication Data
US 2010/0081392 A1     Apr. 1, 2010

(30) Foreign Application Priority Data

Jul. 3, 2006   (FR) ..................................... 06 05994

(51) Int. Cl.
*H04B 17/00* (2006.01)
(52) U.S. Cl.
USPC .................. 455/67.11; 455/67.13; 455/67.14; 455/39; 455/293; 455/226.1; 455/313; 455/522; 455/127.1
(58) Field of Classification Search
USPC .................. 455/39, 67.11, 67.13, 296, 226.2, 455/313, 13.4, 522, 127.1, 41.2, 456.1, 500, 455/525, 226.1, 67.14; 375/316, 322, 324, 375/326, 340, 344, 345, 350
See application file for complete search history.

(56) References Cited

U.S. PATENT DOCUMENTS

| | | | |
|---|---|---|---|
| 5,793,174 A * | 8/1998 | Kovach et al. | 318/468 |
| 5,801,626 A | 9/1998 | Addy | |
| 5,898,397 A * | 4/1999 | Murray | 341/176 |
| 6,150,936 A | 11/2000 | Addy | |
| 6,272,342 B1 * | 8/2001 | Havinis et al. | 455/433 |
| 7,072,671 B2 * | 7/2006 | Leitch | 455/456.1 |
| 2002/0075133 A1 * | 6/2002 | Flick | 340/5.64 |
| 2002/0111182 A1 * | 8/2002 | Sawyer | 455/522 |
| 2003/0145956 A1 | 8/2003 | Domel et al. | |
| 2003/0145958 A1 | 8/2003 | Domel et al. | |
| 2005/0022946 A1 * | 2/2005 | Domel | 160/168.1 P |
| 2005/0185737 A1 * | 8/2005 | Yamauchi | 375/316 |
| 2005/0215210 A1 * | 9/2005 | Walker et al. | 455/130 |

(Continued)

FOREIGN PATENT DOCUMENTS

| | | | |
|---|---|---|---|
| EP | 1 333 706 A | 8/2003 | |
| WO | WO 03/094564 A1 | 11/2003 | |
| WO | WO 2012143749 | * 10/2012 | |

*Primary Examiner* — Temesgh Ghebretinsae
*Assistant Examiner* — Md Talukder
(74) *Attorney, Agent, or Firm* — Frommer Lawrence & Haug LLP; Ronald R. Santucci

(57) ABSTRACT

Method of communicating by radio frequencies in a home-automation installation comprising at least one command transmitter and at least one command receiver, comprising the following steps: receiving by virtue of a radiofrequency receiver of a command receiver a signal transmitted by a command transmitter, —measuring the power level of the signal received, comparing the power level measured with a power level recorded in a memory of powers that are blocked at the level of the command receiver, in the case where the measured power level corresponds to the power level recorded in memory, not processing the signal received.

11 Claims, 4 Drawing Sheets

(56) References Cited

U.S. PATENT DOCUMENTS

| | | | |
|---|---|---|---|
| 2006/0109966 A1* | 5/2006 | Sasakura et al. | 379/177 |
| 2007/0296547 A1* | 12/2007 | Pellarin et al. | 340/7.22 |
| 2008/0074258 A1* | 3/2008 | Bennett et al. | 340/541 |
| 2009/0135732 A1* | 5/2009 | Maxson | 370/252 |
| 2009/0228724 A1* | 9/2009 | Chinen et al. | 713/300 |
| 2009/0318089 A1* | 12/2009 | Stratford et al. | 455/67.11 |
| 2011/0159827 A1* | 6/2011 | Suliman et al. | 455/115.4 |
| 2011/0312285 A1* | 12/2011 | Amir et al. | 455/69 |
| 2012/0142393 A1* | 6/2012 | Won et al. | 455/522 |
| 2012/0265909 A1* | 10/2012 | Mignot | 710/106 |

* cited by examiner

METHOD OF COMMUNICATING BY RADIO FREQUENCIES IN A HOME-AUTOMATION INSTALLATION

This application is a 371 of PCT/IB2007/001831 filed on Jul. 3, 2007 published on Jan. 10, 2008 under publication number WO 2008/004085 A and claims priority benefits to French application number 06 05994 filed Jul. 3, 2006, the entire disclosure of which is incorporated herein by reference.

The invention relates to the field of home-automation control systems making it possible to command the movement of movable coverings for openings of the house, such as for example blinds, doors, windows, garage doors, gates, diverse solar screens or shades.

These control systems generally comprise control points, portable or fixed, and actuators, making it possible to bring about the movement of the movable coverings for openings of the house.

The control points generally have a more or less advanced user interface allowing a user to send control commands to the actuators. The interface can thus comprise push buttons to control opening, closing, or stopping of the movement.

The control points can also be sensors or automation facilities, with or without user interface.

In a home-automation installation such as this one, the control commands are transmitted from the control points to the actuators in a wired or wireless manner, for example by radiofrequency waves.

In a monodirectional system, the control points have a simple transmit function, while the actuators comprise a control command receiver.

Advantageously, the control points are at one and the same time command transmitters and information receivers, just as the actuators are command receivers and information transmitters. Thus, these elements communicate in a bidirectional manner.

In particular in the case of radiofrequency communication, the signals are transmitted without direction and can be received by various receivers listening out. To avoid spurious commands, the signals are coded and incorporate identifiers (that of the transmitter and/or of the receiver), which make it possible to define from where the message comes and/or to whom it is addressed.

Increasingly, such installations incorporate self-powered actuators, that is to say ones that are not connected to a mains power source. The autonomy related problem within the framework of wireless communication is that of energy consumption. To limit this consumption, the receiver of the actuator is active only during short time periods, during which it listens out for whether it detects a transmitted signal, these being separated by long time periods during which it is inactive.

The periods of activity of the receiver must be long enough to detect at least one signal portion. If such is the case, the receiver remains listening, that is to say activated, until it hears a complete frame and may optionally react to the latter. If the power level of the signal is high enough, the receiver activates its microprocessor and analyses the signal. A control point transmitting the signal must consequently transmit a series of signals, so as to be certain of being heard by the receiver.

The problem with such an installation is related to the environment in which it is situated. Specifically, in particular on certain radio frequencies (for example 433.42 MHz), the disturbances may be numerous. This frequency is in fact used by various items of electronic equipment (weather stations, wireless audio headsets, etc.) which transmit signals regularly or indeed almost continuously during certain time spans. Although these signals comprise a priori frames that are not identical to those of the protocol used for communication between the control point and the actuator, they generate spurious wakeups and unnecessary analyses which give rise to unnecessary energy consumption at the level of the receiver of the actuator.

Additionally, it is possible that in the environment of the system there are other transmitters using the same protocol to converse with other receivers. These other transmitters are therefore not paired with the receiver of the actuator, that is to say there has been no prior exchange of an identifier between the transmitter and the receiver. Such for example is the case for a wind sensor neighboring the installation which regularly transmits signals for the attention of another actuator with which it is paired, within the framework of its normal operation (such operation makes it possible to ensure, in particular within the framework of a sensor related to a function for making the product to be actuated secure, that the sensor is indeed in an operational state).

The over-consumption generated at the level of the receiver by an unpaired sensor which nevertheless transmits according to the same protocol frames signifying its proper operating state (4 bursts of 5 frames) every 15 minutes is estimated at 25%.

To partially remedy this problem of disturbances and spurious wakeups, a first solution is generally implemented:

A first level of filtering of the signals received by the receiver consists in measuring their power level. If the power of a signal is below a predetermined threshold, the signal is not processed and the receiver goes back to sleep immediately. A signal power indicator is commonly called RSSI (Received Signal Strength Indicator). The receiver receives a signal transmitted by a transmitter, generates a measurement equivalent to the RSSI of this signal (indicative of the power level of this signal) and processes this signal only if the measurement is greater than the predetermined threshold.

For example, in the document US 2005/0185737, a radiofrequency receiver is used in which the signals received with a power greater than a threshold are processed and the signals received with a power less than this threshold are ignored so as to save the energy of the receiver.

In the document WO 03/094564, a system comprises several devices communicating by radio. In this system, a measurement of quality of radio signals received is used to determine the relative positions of the devices. In order to save energy, a received-signal power measurement can be used to determine whether a device is operating correctly or whether a device has been moved. Thus, a signal received with an unusual power level can be ignored in a position determination procedure.

Systems for measuring the RSSI are known, for example in alarm systems to verify the proper operation of the system, and described in particular in the documents U.S. Pat. No. 6,150,936 or U.S. Pat. No. 5,801,626 whose contents are incorporated by reference into the present patent application.

The aim of the invention is to provide a communication method obviating the drawbacks cited above and improving the known communication methods of the prior art. The invention proposes to improve the management of nuisance signals received by receivers although they are not addressed to the latter, so as to avoid spurious wakeups of the means for processing the signals that are expensive in terms of energy, doing so without impeding the reception of the signals intended for the receivers.

The communication method according to the invention is defined by claim 1.

Various modes of execution of the invention are defined by the dependent claims 2 to 8.

A radiofrequency command receiver according to the invention is defined by independent claim 9.

A home-automation installation according to the invention is defined by independent claim 10.

The invention is based on the fact that most transmitters disturbing the receivers of a home-automation system are fixed (sensors fixed to the wall or mounted on the façade or on a roof, weather stations placed on a piece of furniture), and therefore that their transmission power seen by the fixed receivers of the home-automation system (an image of which can be constituted by the RSSI indicator) is almost constant from one transmission to another.

The principle of the invention consists in determining and recording in a list one or more signal power levels each causing a given number of times, in a repeated manner for example, the spurious wakeup of a receiver, that is to say when the receiver wakes up in a spurious manner a given number of times on this or these signal power levels.

In other words, a receiver measures the power level of the signal that it receives. If this power level is not recorded, the receiver awakens a microprocessor which analyses the signal. In the case where the signal is not intended for it, the receiver increments a counter.

After a determined number n of occurrences in which a signal of one and the same power level has fruitlessly awoken the microprocessor, the latter concludes that the signal is not intended for it, the receiver stores the power level. This power level is then said to be "blocked" by the receiver. Subsequently, when a signal having this power level is received by the receiver, the microprocessor will not be awoken to analyze it and the receiver will go back to sleep immediately. The transmission of this signal will then be almost transparent in relation to this receiver.

Several power levels can be blocked if necessary.

The risk that a portable or fixed transmitter intended to communicate with a receiver and used in a zone such that the power level of the signals that it transmits is blocked at the level of the receiver exists. Various solutions can then be implemented to remedy this problem. They can naturally be combined.

The receiver can build a list A of levels of signals of power not to be blocked. This list A can be built during the use of the transmitter-receiver system. Each time a transmitter of the installation transmits a signal, the receiver measures its power level before analyzing the content of the signal. If this signal is addressed to it, it adds the measured power level to the list A.

When a signal power level is on the point of being blocked, the receiver verifies whether the level to be blocked is contained in the list A. If such is the case, provision may be made either that the level not be blocked, or that the number of occurrences of reception of a signal having this power level for blocking be increased.

This solution makes it possible to circumvent the drawbacks when an installer adds to the system a paired fixed remote control which inconveniently transmits signals having the same power as another transmitter foreign to the system and whose signals must as far as possible be ignored by the receivers of the system.

A reinitialization procedure can be put in place to prevent a power level from remaining blocked indefinitely, for example during reception and analysis of a (or several) correctly addressed signal(s). In particular in this case, it is beneficial to store, if possible, the identifier of the transmitter (unpaired and transmitting disturbing signals) corresponding to the blocked level. In this way, upon a new detection of a disturbing signal by the receiver, it is possible to compare the measured power level with the former power level placed in memory and corresponding to the same identifier. In this way, the receiver can block this level more rapidly and/or dynamically adjust the power level to be blocked (tailoring to the variations of a signal power level over time for example).

Another solution to be implemented within the framework of the invention consists in providing a portable transmitter whose transmission power level can be adjusted, whether this be within a series of frames or in a temporary or fixed manner, by the action of the user for example. This solution makes it possible to reduce to the maximum the risks of a spurious blocking and is applicable in particular for a specific transmitter for controlling a self-powered actuator.

The criteria for selecting a power level to be blocked are as follows:
the protocol is not recognized (different or non-decodable frame),
the transmitter is not identified as forming part of the installation (unpaired, unknown identifier),
a verification calculation (checksum or CRC) for checking the frame is false.

Each criterion can be processed differently, that is to say the number of occurrences of the event leading to the blocking can be tailored as a function of the previously identified criterion or criteria.

The format of the frame is dependent on the communication protocol used. If other elements in the environment of the installation described transmit signals on one and the same radio frequency, it is possible to detect rapidly that the frame format is different and to reject these frames without analyzing them. However, the subject of the invention also applies to the detection of spurious signals of another protocol. Specifically, the measurement of the power level of the signal received is the first action performed by the receiver when it wakes up, even before reading the bits of the frame of this signal. Whatever signal is received, the invention therefore makes it possible to determine as rapidly as possible whether a signal received is to be analyzed.

Several counters can be implemented according to the blocking criteria determined and blocking thresholds can be defined as a function of these criteria.

The periodicity of transmission of a disturbing signal can also be taken into account in determining the blocking of a power level. In particular, as described in the example of the neighboring wind sensor, if a disturbing signal is regularly re-transmitted, it can more rapidly be considered to be disturbing and the power level of this signal blocked. In parallel, if a disturbing signal is received several times during a very short time span, the blocking of the power level can also be implemented more rapidly.

Alternatively, if a regular disturbing signal is detected, procedures for determining frequency and for blocking reception on this power level at this determined frequency can be implemented (a clock for regularly waking up the receiver being active).

The appended drawing represents, by way of example, a home-automation installation according to the invention and a communication method according to the invention.

Figure 1:
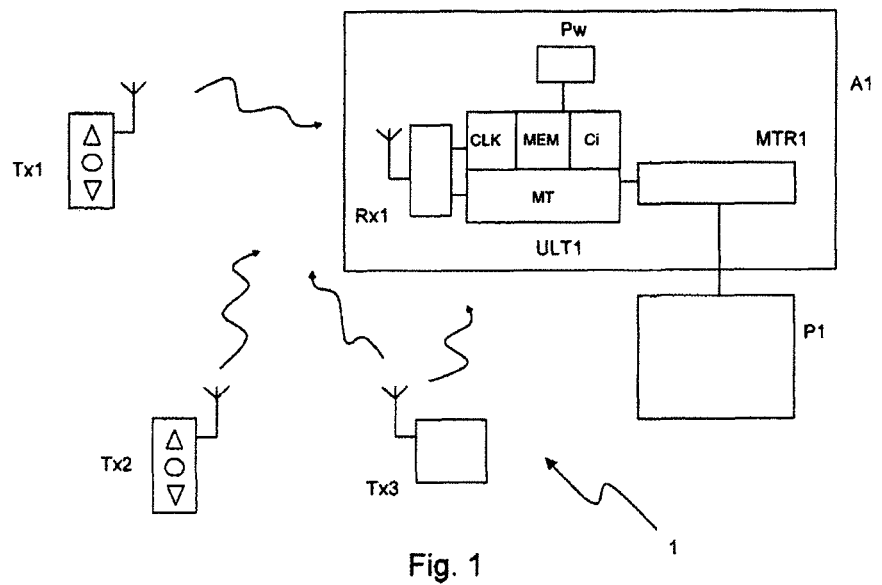
FIG. 1 is a diagram of a home-automation installation according to the invention.

FIG. 1 represents an installation 1 comprising a portable transmitter Tx1, capable of communicating with a receiver Rx1. The installation also comprises an electronic processing unit or logic processing unit ULT1. The latter drives a gear motor MTR1, which gives rise to the movement of a screen P1 such as in particular a shutter or a roller blind. The electronic processing unit ULT1 and the receiver Rx1 are included in an actuator A1. The energy necessary for the operation of the various components of the actuator is provided by a power supply Pw, independent of the mains. This power supply can comprise an electrical energy storage means, rechargeable by solar energy for example. In so far as the actuator A1 is supplied independently of the mains current, it is said to be self-powered. In such an actuator, management of the energy and of the energy consumption is particularly critical. The element A1 could be another type of command receiver. The actuator A1 (also called a command receiver) comprises software means making it possible to govern its manner of operation in accordance with the method according to the invention. These software means comprise for example programs executed by the logic processing unit (ULT1).

The logic processing unit ULT1 comprises several components such as in particular a microprocessor, a clock CLK, a memory MEM, one or more counters Ci and means MT for processing the information received from the receiver Rx1 making it possible in particular to trigger the complete power supply to the logic processing unit.

The radiofrequency receiver Rx1 therefore uses at least a part of the resources of the logic processing unit ULT1 for processing the signals.

The transmitter Tx1 is intended to send commands controlling the movement of the screen, by way of the gear motor MTR1, of the electronic unit which drives it and of the receiver Rx1 which receives these control commands.

The transmitter Tx1 and the receiver Rx1 have previously exchanged information characterizing them, for example an identifier of the transmitter or of the receiver. This prior configuration is termed pairing. The receiver Rx1 is therefore capable of recognizing a signal originating from the transmitter Tx1, of decoding the latter and therefore of understanding the content thereof.

If the transmitter Tx1 transmits a signal while it is situated too far from the receiver Rx1, the power of the signal transmitted is too low and the receiver Rx1 does not process the control command. If the transmitter Tx1 is used in a zone of reception of the receiver Rx1, the latter is capable of receiving the signal, of analyzing it and of causing the implementation of the command transmitted in the signal.

The receiver Rx1 is not listening out for a signal permanently. It is driven by the electronic processing unit ULT1 and more precisely by the clock CLK in such a way as to be active, that is to say listening for a signal, during very short periods spaced out over time (for example the receiver is listening for a signal for 1 ms every 60 ms).

In parallel, the transmitter Tx1 transmits, when it is activated, a control signal in the form of a frame repeated several times consecutively with separating inter-frame silences.

The listening periods, also termed active state or wakeup periods, are determined in such a manner that the receiver is capable of determining whether it receives a signal portion and if such is the case, of remaining active so as to hear a complete frame defining the command.

A second transmitter Tx2 as well as a transmitter sensor Tx3 have been represented in FIG. 1 in the environment of the installation. These transmitters are not paired with the receiver Rx1, but the latter is capable of hearing the signals transmitted by these other transmitters, used in a neighboring installation and using the same communication protocol.

The receiver and the electronic processing unit comprise means for determining a power level of a received signal. Preferably, these means make it possible to calculate an RSSI indicator. They also comprise means for blocking the analysis or the processing of a signal if the latter has a power level substantially equal to the level determined. Abandoning the analysis of the signal corresponds to the logic processing unit ULT1 and the receiver Rx1 switching to the inactive state.

Figure 2:
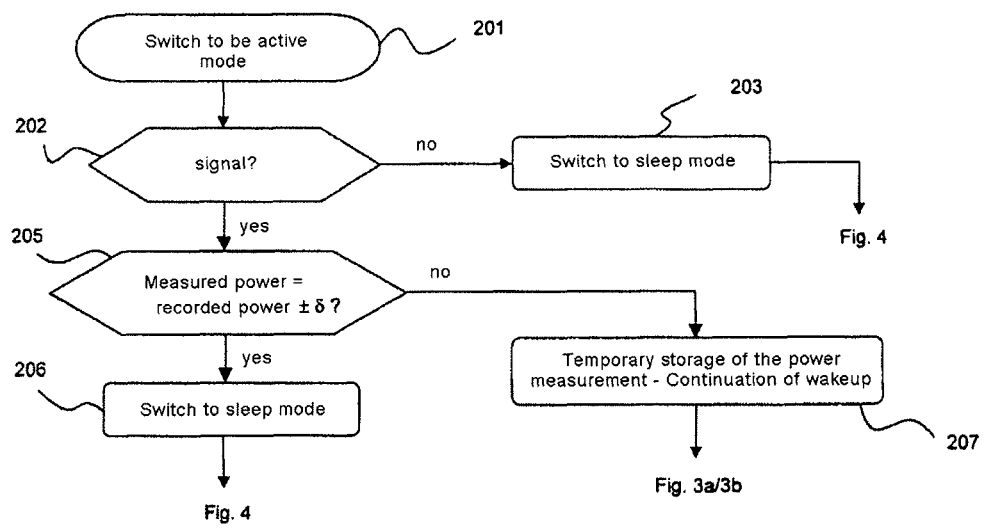
FIG. 2 is a flowchart illustrating a procedure for discriminating signals according to the invention.

FIG. 2 illustrates a phase of the communication method when the receiver Rx1 wakes up or enters active mode in a step 201. In a step 202, the receiver tests whether it is receiving a signal. If such is not the case, the receiver again switches to sleep mode in a step 203. The method then continues as described below with reference to FIG. 4. If the receiver receives a signal in step 202, it switches to a step 205 in which it measures the power level of this signal and determines whether the latter corresponds substantially to a power level previously determined and stored in memory as a blocked power level. If such is the case, the receiver immediately toggles to the sleep mode in a step 206. If such is not the case, the receiver remains in active mode and the power level is temporarily recorded in memory. The method then continues as described below with reference to FIGS. 3a/3b. It is not necessary for the power level to be strictly equal to the blocked level recorded in memory in order for step 206 to be carried out. Indeed, a certain variation of the value of the power level is tolerated, it being possible for a certain number of exterior conditions to have an impact on the power level measured. Preferably, a measured power level varying by plus or minus 4% with respect to the recorded power level is considered to be equal to the recorded power level. It is also possible to choose a span defined as plus or minus 5 or 6% around the recorded power level. Likewise, it is possible to define a span of plus or minus 3 dB around the recorded power level. These spans can in particular be tailored as a function of the power measurement means used.

Figure 3A:
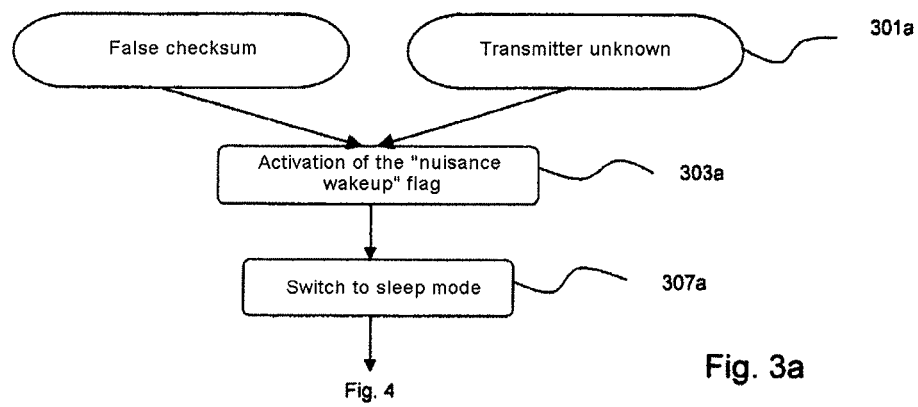
FIGS. 3a, 3b, 4 and 6 are flowcharts illustrating various alternative procedures for switching a command receiver to sleep mode.
Figure 3B:
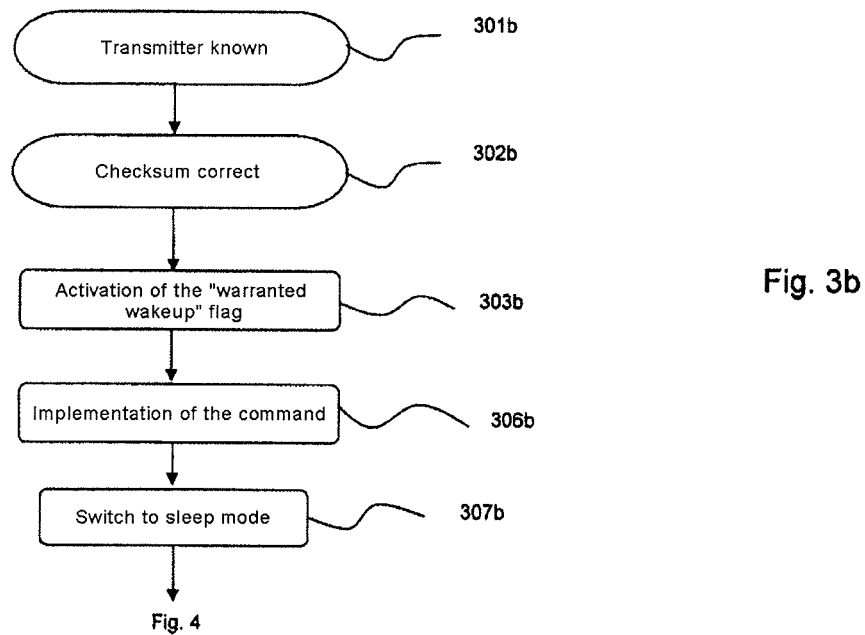

FIGS. 3a and 3b illustrate a part of the analysis of the signal received by the receiver Rx1. Several criteria can be analyzed, including among them, the identifier of the transmitter or the verification calculation (checksum).

FIG. 3a shows that if, in a step 301a, one or the other of these criteria is false (the checksum calculated on the basis of the frame received does not correspond to the checksum transmitted in this frame, or the transmitter does not form part of the transmitters paired with the receiver Rx1), the receiver Rx1 determines that a nuisance wakeup is involved and triggers, in a step 303a, the temporary switching of a nuisance wakeup indicator.

Figure 4:
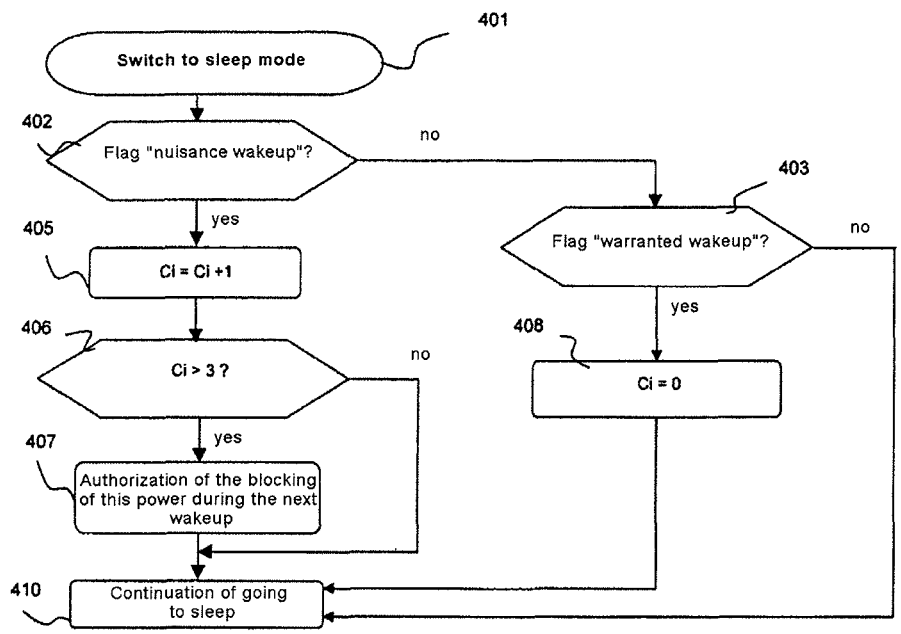

The receiver then again switches to sleep mode in a step 307a. The continuation of the method is represented in FIG. 4.

In the case of FIG. 3b, the identifier of the transmitter is recognized in a step 301b and the checksum verified in a test step 302b is correct. A warranted wakeup is then involved and the receiver Rx1 triggers, in a step 303b, the temporary switching of a warranted wakeup indicator. This procedure serves for example if one wishes to be able to reinitialize the blocking of a signal power level upon receipt of an identified signal (so as not to block a power level indefinitely). Obviously, other schemes for achieving this reinitialization can be implemented.

In this case, moreover, the signal is processed by the receiver and an action corresponding to the signal is optionally implemented by the receiver.

When the signal has been identified, the actuator A1 executes the control required in a step 306*b*, and the receiver Rx1 toggles into a sleep state again, in a step 307*b*. The continuation of the method is represented in FIG. 4.

FIG. 4 illustrates the steps implemented upon switching the receiver to sleep mode. These steps are implemented whatever time is spent by the receiver in an active state. Alternatively, an immediate switching into a sleep mode without analysis of the indicators in the case where no signal has been received during the wakeup period will be preferred.

Before switching to sleep mode, the electronic processing unit tests, in a step 402, the state of the nuisance wakeup indicator. If the latter is active, proving that the last signal received was a nuisance signal, a counter $C_i$, linked to the power level stored temporarily in step 207 is incremented in a step 405. Once read, the indicator is deactivated. When the value of this counter $C_i$ exceeds a predetermined threshold, for example 3, the power level temporarily placed in memory during step 207 is recorded in memory as a blocked power level in a step 407. Upon the next wakeups, the power levels of the signals received will be compared with this new blocked level.

Finally, in a step 410, the receiver is again immersed into a sleep state.

The state of the counter $C_i$ can be used during a maintenance operation, indeed it makes it possible to keep a record of the nuisance signals. If the method comprises a step of reinitializing the counter $C_i$, it is also possible to dissociate a nuisance signals total counter and a reinitialized counter.

In the case of a reinitialization of the blocking, the electronic processing unit reads or tests, in a step 403, the state of the warranted wakeup indicator. If the latter is active, showing that it has been possible to identify and process a signal, the blocking counter $C_i$ for the last signal level, or the whole set of blocking counters $C_i$, is reinitialized in a step 408. Just as for the nuisance wakeup indicator, the warranted wakeup indicator is deactivated once read.

Finally, the receiver is again immersed into a sleep state in step 410.

On the other hand, if in the test step 403, this indicator is not active (for example in the case where the last signal received was transmitted with a blocked power level and therefore discarded by the receiver), the receiver switches to a sleep state in step 410.

The reinitialization of the blockages makes it possible to prevent a power level from remaining blocked indefinitely. On the other hand, the risk of a blockage disturbing the operation of the installation can be dealt with in a finer manner.

Figure 5:
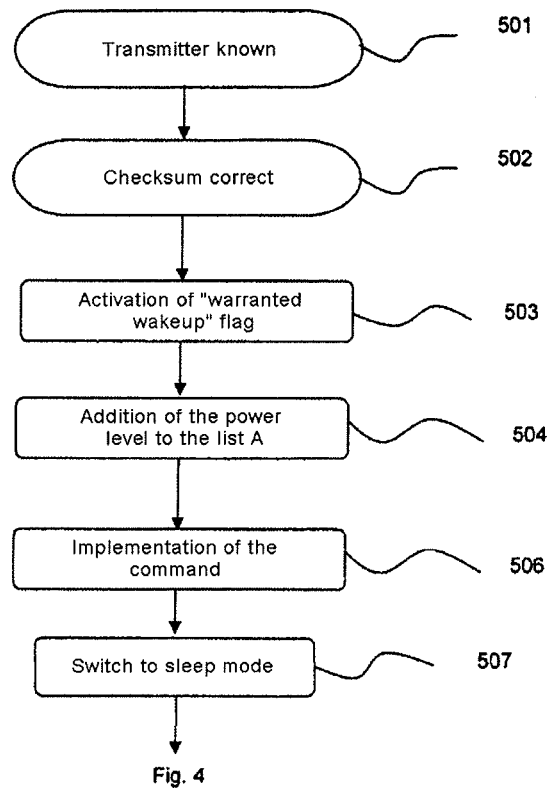
FIG. 5 is a flowchart illustrating a procedure for recording a signal power level that cannot be ignored by a command receiver.

In particular, as represented in FIG. 5, the receiver Rx1 can establish, in the same manner as a measured signal power level can be placed in memory as blocked level, a list A of levels not to be blocked. Thus, each power level measured upon receiving a signal is stored temporarily in the course of step 207. In the case where the signal is actually addressed to the receiver Rx1, the power level can be stored in a list A of levels not to be blocked during a step 504. Steps 501 to 503 and 506 to 507 are identical to steps 301*b* to 307*b* described with reference to FIG. 3*b*.

Definitive storage can occur only after receiving a certain number of signals correctly addressed on this same power level.

Alternatively, the reception of a correctly addressed signal can decrement a counter $C_i$ associated with this level, this same counter $C_i$ possibly being used for counting the spurious signals for this same level.

In a variant, if a correctly identified signal is received with a power level that is in the process of being blocked (whose counter $C_i$ is positive but less than the threshold), a warning message can be returned by the receiver Rx1. In this way, if the signal is transmitted by a new control point undergoing installation, the installer of the new control point is rapidly warned if a problem arises in its installation and can take the necessary measures (modify the location of the new control point, record the power level of the new control point as a level not to be blocked, etc.).

Figure 6:
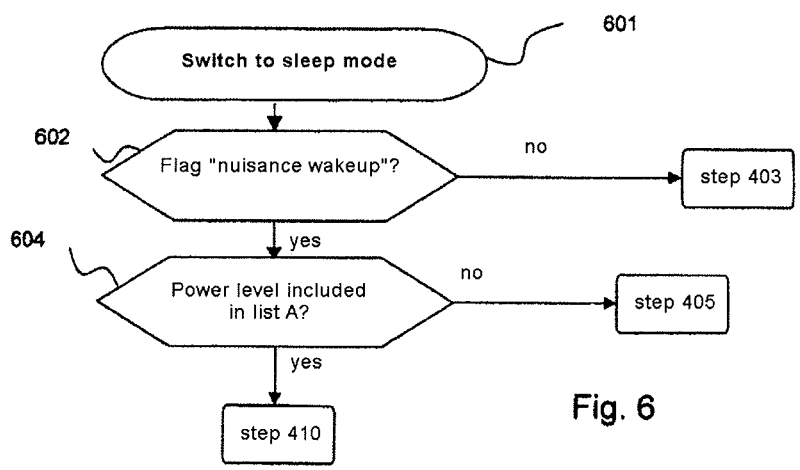

An alternative procedure for switching to sleep mode is described with reference to FIG. 6. It differs from that described with reference to FIG. 4 in that it comprises an additional test step 604. In this step a test is conducted to check whether the power level of the signal that caused a spurious wakeup is included in the list A. If such is the case, the receiver Rx1 toggles directly into the sleep mode in step 410. There is then no incrementation of the blocking counter $C_i$. If such is not the case, step 405 is performed.

The procedures described with reference to FIGS. 3*a* and 3*b* have tests relating to a checksum and to the identification of the transmitter. It goes without saying that other criteria can be tested, such as for example a decryption key, a frame format, etc. These various criteria can be weighted in various ways. In particular, depending on the case, it will be warranted to accord more importance to certain criteria causing spurious signals, depending on the analysis time and therefore the energy consumption.

Thus, for example, in the case of a (paired) transmitter of the installation, installed at the range limit and for which the errors in transmitting the bits of the frame of the signal bring about a false verification calculation (checksum or CRC) for the frame, an occurrence of the phenomenon may have incremented the counter by a number less than 1, for example ¼. The risk of rejecting a transmitter used at the range limit will therefore be greatly decreased.

Alternatively, the blocking decision can occur in accordance with a disturbance frequency criterion. The electronic processing unit ULT1 then determines a power level to be blocked and the periodicity of transmission of the disturbing signal, so as to block the power level only during the time spans covering the regular transmission of this disturbing signal.

FIG. 2 mentions a value δ defining a span around a blocked power value. Thus, if the power of a signal lies in this span, this signal is not processed. The power level of a signal can in fact be slightly variable, even for a fixed transmitter, since it depends in particular on the environmental conditions, the quantity of energy available, etc. The value δ can be determined in a fixed manner.

Advantageously, this value is determined in a dynamic manner. Specifically, if the receiver Rx1 stores the identifier of the transmitter (unpaired and transmitting disturbing signals) associated with the blocked level, it is possible to determine variations in the power that is related to this particular transmitter, especially during the first measurements before blocking. Therefore, the value δ can be specific to the transmitter disturbing the receiver. Alternatively, it is the mean value of blocked power that is adjusted.

The blocking span must be large enough to cover the variations in level of disturbing signals, but without spuriously blocking paired transmitters of the installation.

If the blocking procedure is implemented in combination with a reinitialization of the blocking levels, upon a new detection of a disturbing signal by the receiver, it is possible to compare the measured power level with the former level placed in memory. In this way, the receiver can again dynamically adjust the span of power levels to be blocked.

Dynamic adjustment of the span of power levels can optionally also be implemented for constructing the list A of power levels not to be blocked.

To take care of a possible risk of spurious blocking of a paired transmitter, in particular of a portable transmitter, another solution can be implemented: a transmitter suitable for specifically controlling a self-powered actuator can comprise means for adjusting the level of its transmission power.

Figure 7:
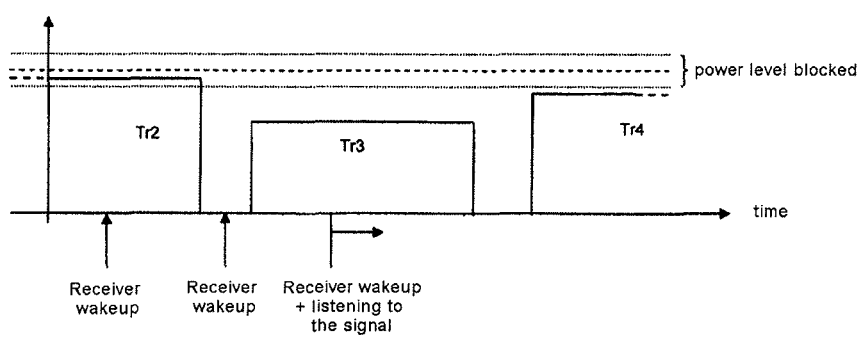
FIG. 7 is a chart illustrating the variations in transmission power of a command transmitter.

The principle is represented in FIG. 7. The transmitter Tx1 transmits various bursts of several frames, Tr1, Tr2, Tr3, Tr4, in the course of the transmission so as to ensure reception by the receiver Rx1. These various bursts (or frames) are transmitted with different transmission power levels. The receiver Rx1 wakes up in a regular manner and goes back to sleep immediately when it notes that the signal received has a blocked power level or when it does not receive any signal (no transmission or inter-frame interval). It does not for example wake up the logic processing unit ULT1 when a first frame Tr2 is received because it notes that the measured power level is a blocked level. On the other hand, a new frame Tr3 received by the receiver Rx1 causes the logic processing unit ULT1 to be woken up and this frame to be processed by this logic processing unit.

Alternatively, the transmission power level is adjusted in a temporary or fixed manner, by the user himself, by means of a switch for example. If the user notes that a signal does not seem to be processed by the receiver, he can toggle the switch and reattempt to send the control command.

The invention claimed is:

1. A method of communicating by radio frequencies in a home-automation installation comprising at least one command transmitter and at least one command receiver, comprising the following steps:
   providing a radiofrequency receiver of a command receiver and an associated actuator,
   receiving by means of the radiofrequency receiver a signal transmitted by the command transmitter,
   measuring within the command receiver a power level of the signal received,
   comparing within the command receiver the measured power level with a power level recorded in a memory of powers that are blocked at the level of the command receiver, wherein the power level recorded in the memory of powers is a power level of a disturbing signal,
   in the case where the measured power level corresponds to the power level recorded in memory, the command receiver does not process the signal received, and
   in the case where the measured power level does not correspond to any power level recorded in memory, processing the signal by the command receiver and causing the actuator to implement an action corresponding to the signal received by the receiver,
   wherein the power level of the disturbing signal is a signal power level previously received by the command receiver a predetermined number of occurrences and determined as not necessitating processing by the receiver.

2. The communication method as claimed in claim 1, which comprises the following prior steps:
   receiving by means of a radiofrequency receiver of a command receiver a signal transmitted by a command transmitter,
   measuring the power level of the signal received,
   recording this power level in the memory of powers that are blocked at the level of the command receiver if the signal is not identifiable by the command receiver.

3. The communication method as claimed in claim 1, which comprises the following prior steps:
   receiving by means of a radiofrequency receiver of a command receiver a signal transmitted by a command transmitter,
   measuring the power level of the signal received,
   if the signal is not identifiable by the command receiver, incrementing a counter associated with the power level,
   if the value of the counter exceeds a predetermined threshold, recording this power level in the memory of blocked powers.

4. The communication method as claimed in claim 3, wherein the counter associated with a power level is reinitialized after the command receiver has received a correctly identified signal of this power level.

5. The communication method as claimed in claim 2, wherein a power level recorded in the memory of blocked powers is erased after the command receiver has received a correctly identified signal of this power level.

6. The communication method as claimed in claim 1, wherein a signal is non-identifiable by the command receiver if its frame is not consistent for the command receiver or if it is not addressed to this receiver.

7. The communication method as claimed in claim 1, which comprises the following steps:
   determining the identity of the command transmitter that transmitted the signal,
   if the power level of this command transmitter is recorded in the memory of blocked powers, modifying this record as a function of the measurements of power of the signals transmitted by this command transmitter.

8. The communication method as claimed in claim 1, which comprises a step of detecting a modification in the course of time of a power of a signal received by the command receiver and transmitted by an identified transmitter and a step of modifying in the course of time a record of a power level in the blocked power memory in such a way that the command receiver continues not to process the signals transmitted by this identified transmitter despite the modification of the power level of the signals transmitted by this identified transmitter.

9. A radiofrequency command receiver which comprises hardware means and software means for implementing the communication method as claimed in claim 1.

10. A home-automation installation comprising at least one command receiver as claimed in claim 9 and at least one command transmitter comprising means for varying its transmission power.

11. The method of claim 1, comprising:
   determining an identifier of the command transmitter of a particular received disturbing signal; and
   associating the power level of the particular received disturbing signal with the determined identifier in the power levels recorded in the memory of powers.

* * * * *